United States Patent
Anastasiadis et al.

(10) Patent No.: US 10,638,770 B2
(45) Date of Patent: May 5, 2020

(54) SYSTEM FOR THE PRODUCTION OF MULTI-STRAINED YOGURT

(71) Applicant: DELTA S.A. INDUSTRIAL AND COMMERCIAL COMPANY OF FOOD PRODUCTS, Ag. Stefanos, Attica (GR)

(72) Inventors: Achilleas Anastasiadis, Athens (GR); Nicolaos Koumanoudis, Ekali (GR); Nicolaos Pitsinis, Pefki (GR); Artemis Hatzigeorgiou, Anthousa (GR)

(73) Assignee: DELTA S.A. INDUSTRIAL AND COMMERCIAL COMPANY OF FOOD PRODUCTS, Attica (GR)

( * ) Notice: Subject to any disclaimer, the term of this patent is extended or adjusted under 35 U.S.C. 154(b) by 492 days.

(21) Appl. No.: 14/905,897

(22) PCT Filed: Jul. 17, 2014

(86) PCT No.: PCT/GR2014/000041
§ 371 (c)(1),
(2) Date: Jan. 18, 2016

(87) PCT Pub. No.: WO2015/008099
PCT Pub. Date: Jan. 22, 2015

(65) Prior Publication Data
US 2016/0150800 A1 Jun. 2, 2016

(30) Foreign Application Priority Data
Jul. 18, 2013 (GR) .............................. 20130100422

(51) Int. Cl.
*A23C 9/12* (2006.01)
*A23C 9/123* (2006.01)

(52) U.S. Cl.
CPC .............. *A23C 9/122* (2013.01); *A23C 9/123* (2013.01); *A23C 2260/05* (2013.01)

(58) Field of Classification Search
CPC ...... A23C 9/122; A23C 9/123; A23C 2260/05
USPC .......... 426/478, 490, 491, 580, 583; 99/485, 99/495
See application file for complete search history.

(56) References Cited

U.S. PATENT DOCUMENTS

2007/0166447 A1  7/2007  Ur-Rehman et al.

FOREIGN PATENT DOCUMENTS

WO     2009059267 A1    5/2009

OTHER PUBLICATIONS

International Search Report dated Feb. 18, 2016 issued by WIPO in International Patent Application No. PCT/GR2014/000041 which is the international application that the present application is a national phase of.
International Preliminary Report on Patentability dated Feb. 23, 2016 issued by WIPO in International Patent Application No. PCT/GR2014/000041 which is the international application that the present application is a national phase of.

*Primary Examiner* — Leslie A Wong
(74) *Attorney, Agent, or Firm* — Porzio Bromberg & Newman P.C.

(57) ABSTRACT

The invention describes a system of industrial production of strained yogurt which enables the natural straining by means of separation means, with the optimal use of the raw material, with the least possible stressing of the raw material and with the minimum possible loss of useful ingredients in the whey which is removed after straining and with the optimal stability of the characteristics of the final product, in each production batch. The invention describes the critical conditions of processes upstream of (namely before) the straining process, such as the physiochemical features of the raw milk, conditions of pasteurization and homogenization, conditions of incubation etc and the stacks of suitably selected and positioned membranes that are used for the straining, so that the final strained yogurt has the desired physiochemical features (proteins, fat, total solids) upon its exit from the straining rig. During the straining process, the yogurt is consecutively strained at least twice and the process is complemented by the stages downstream of (namely after) the straining, such as the conditions of cooling, storage before packaging, packaging conditions etc., which also are critical factors in order to realize the final outcome.

11 Claims, 2 Drawing Sheets

SYSTEM FOR THE PRODUCTION OF MULTI-STRAINED YOGURT

FIELD OF THE INVENTION

The invention is intended for the sector of yoghurt production and more precisely, the sector of the production of strained yoghurt of diverse fat content, through industrial production (wide scale production), based on the implementation of a straining process of the yoghurt coagulum.

PRIOR ART

The traditional way of producing strained yoghurt in Greek homes was based on first, curdling whole milk, coming either from cows or from other animals, e.g. goats or sheep, into yoghurt. Right after, the yoghurt's liquids were strained by placing the yoghurt on a loosely woven cloth, also known as cheesecloth, and then by hanging it or placing it into a second container (colander) for several hours until the desired outcome was achieved.

As for the small cottage industries or the small craft industries of today, the traditional way of producing strained yoghurt is based on the same principles or producing yoghurt first and then straining it by placing it into a container featuring a perforated bottom, inside which a loosely woven cloth can be placed. The traditional way of producing strained yoghurt is described in the Greek Codex Alimentarius, Article 82: "Characterized as strained yoghurt . . . is the product received from whole yoghurt after the removal (straining) of a part of the water along with the lactose, minerals etc. that are dissolved in it. It should contain at least 8% fat except for the case of strained cow yoghurt, which should contain at least 5% fat".

A serious disadvantage of this traditional way of straining yoghurt is the very limited shelf life of the final product, mainly due to the microbiological contaminations stemming from the sequence of actions which expose the milk and/or the yoghurt either to surfaces or to the environment (e.g. to air), and due as well to the human factor that is actively involved in the production stages. The limited shelf life of the final product poses restrictions on its long-distance transportation from the production location, thus its consumption should be limited within the local community.

Furthermore, the conditions of such a production are not stable, with the ambient temperature being a critical factor which affects the fermentation as well as the lengthy straining process. Another critical factor, which does not remain stable and affects the conditions of production, is the chemical structure of milk itself, which is subject to the expected seasonal fluctuations in terms of protein and fat content. As a result, the final product is not repeatable and is unstable throughout different productions, in terms of taste as well as of texture.

The attempts of producing strained yoghurt in Greece on an industrial scale, namely on large scale, are mainly based on the mechanical straining techniques, which were widely known in other European countries for the production of a certain type of fresh cheese with features similar to the ones of strained yoghurt; in fact, the main difference between the cheese in question and strained yoghurt lies on the different bacteria used during its acidification and curdling.

The main stages of such an industrial scale production process are, on the first stage, the production of zero fat yoghurt, then its mechanical straining by means of centrifuge, which results in draining a part of the coagulum's whey and finally the mixing process with sweet or sour milk cream, at the ratio required in order to achieve the desired fat content in the final product. In this procedure, one starts from zero-fat yoghurt, because the subsequent centrifugation would separate the fat anyhow.

Relatively recently, a centrifugation system for yoghurt has been developed, capable of processing non-zero fat yogurt, however this system is characterized by a limited throughput, not well suited for industrial scale production.

Furthermore, the mechanical straining by centrifuge literally strains (tires) the product: the centrifugation process is violent, since it actually submits the centrifuged yoghurt to artificial gravity, resulting in the final product being less natural.

Equally important are the conditions of the production process before and after straining, such as the conditions of milk pasteurization, the yoghurt culture selected, the incubation conditions (temperature, curdling time), the conditions of yoghurt cooling (the equipment, the temperature, the time etc), the packaging conditions etc. The aforementioned factors as well as the processing prior to straining, affect the features of the final product as well as the process itself and its efficiency.

Indicative disadvantages and problems associated with the existing level of technology in terms of strained yoghurt production on a large scale are the following:

- The mechanical stressing of the yoghurt coagulum, due to the additional mechanical processing during the straining stage results in a lower product firmness versus the desired firmness value for the final product, as well as in a low production yield; namely the final product is less firm than it could have been if it hadn't been mechanically strained, and this is a disadvantage of the technology in question.
- The instability throughout the production process, which leads to non-homogenous products within the same production, both in terms of taste and of texture, is an unwanted factor in a large scale production.
- The sensitivity of the system, which is affected by several parameters, such as the composition of milk, the progress of milk/cream fermentation, the correct function of the in-line mixing of different phases during which the yoghurt coagulum is mixed with the fat phase, in order to standardize the fat of the final product. This sensitivity leads to non-homogenous, non-repeatable products, both within the same production, and from production to production, which is also not desired for large scale production.
- When applying low yield straining processes, like it is the case in mechanical straining with centrifugation, there is significant loss of proteins and caseins that are carried away with the whey. These ingredients are desirable to remain in the final product because they can contribute significantly to its structure, therefore their loss to the whey is a disadvantage. This leads to the need of straining more parts of milk in order to produce one part of the final strained yoghurt, namely more milk is necessary to be processed in order to yield the desired product, which would include the target protein content.
- The structure of the final product is obviously too opaque, without a shine, and it often looks like "cheese" with a powdery texture, especially in the case of low fat content, namely the structure and texture of the final product are not the ones expected by the consumer.
- Production is more difficult because of the more complex handling required, such as mixing with fresh cream in order to standardize the fat of the final product, especially in the typical case of mainstream centrifugation systems used for straining yoghurt of a non-zero fat content.

On top of the disadvantages and problems described above, it is a fact that the main principle of straining via mechanical separation of the yoghurt whey, as it is known and is being currently implemented wherever large scale production is made, lies far from the principal traditional concept of straining yoghurt by means of natural separation (cloth, container with holes).

DESCRIPTION OF THE INVENTION

The objective of the present invention is to present for the first time an industrial system and process for the production of strained yoghurt, designed and implemented in a way that approximates as much as possible the same basic straining principle of the traditional method, namely natural straining by means of a separation medium, while this system and process also solves the problems of the previous level of technology regarding a large scale production. More specifically, the present invention describes a system and a method, which realize the production of strained yoghurt on a large scale:

with the optimal use of the raw material,
with the least possible stressing of the raw material and
with the minimum possible loss of useful ingredients in the whey which is removed after straining,
with the optimal stability of the characteristics of the final product, both within the same as well as across consecutive production batches and
with the optimal characteristics of the final product, which approximate those of the traditional strained yoghurt, as perceived by the consumer of the Greek strained yoghurt.

We describe the following factors associated with the implementation of the present invention:

the critical conditions of processes upstream of (namely before) the straining process, such as the physiochemical features of the raw milk, conditions of pasteurization and homogenization, conditions of incubation etc,
the stacks of suitably selected and positioned membranes that are used for the straining, so that the final strained yoghurt has the desired physiochemical features (proteins, fat, total solids) upon its exit from the straining rig, that during the process, the yoghurt should be consecutively strained at least twice, that the process is complemented by the stages downstream of (namely after) the straining, such as the conditions of cooling, storage before packaging, packaging conditions etc., which also are critical factors in order to realize the final outcome.

The invention describes an arrangement for the production of strained yoghurt on an industrial scale and in big quantities, which comprises:

a pump (1) which is fed with incubated yoghurt, with a fat content dependent on the fat type of strained yoghurt we aim to produce,
pumps (2, 13) which transfer the yoghurt in order for it to be strained,
wherein a large portion of the yoghurt is introduced in the first stage of straining (A) through a pump (2),
from the first stage of straining are generated yoghurt (4) that has been submitted to a first straining cycle and whey (3), the whey (3) is collected for other uses,
after the first straining, the strained yoghurt (4) goes through in a second straining stage (B) by means of a new pump (13), and This arrangement is characterized in that:
the straining process is multiple, namely it is taking place at least twice, every straining stage comprises at least one filter that is made of flexible straining membrane (6 or 7 or 8), as well as a whey collection tube (also referred to herein as a chute) (9),
the flexible straining membrane is wound in spiral (spiral wound) around the whey collection tube (9), in such a way so that the yoghurt that is inserted is pressurized by means of the pressure of the feed pump (2, 13); its whey enters through the straining membranes in an adjacent whey collection compartment layer (11), which compartment in question leads the whey to the collection tube (9),
after the first stage of straining (A), the yoghurt is led, by means of a pump (13), to the second stage of straining (B), where the same process of straining and removal of the whey collected is repeated.

It is advantageous that, in the arrangement of the present invention, the multiple straining consists of eight stages (A, B, C, D, E, F, G, H), namely the straining takes place eight times, the one after the other, and, from the second stage (B) onwards and during the next stages (C, D, E, F, G, H) the features and conditions of the second stage (B) are repeated.

It is advantageous that, in the arrangement of the current invention, each and every straining stage comprises at least three flexible straining membranes (6,7,8), which function simultaneously and in parallel.

Preferably, in the arrangement of the present invention, during the first stage of draining (A) and compared to the second stage (B) and to every subsequent one (C, D, E, F, G, H)

the flexible straining membrane(s) is (are) wrapped in denser spiral, with narrower distances between the spiral of the wrapping and
the membranes are divided by thinner layers (10),
we use for straining different types of membrane cartridges, namely the separation grid is thinner during the first straining process (A), while a thicker grid is used from the second straining process (B) onwards and for each subsequent stage.

An advantage of the invention described relies on the fact that, in the arrangement described, the pump (13) used from the second stage of straining (B) and at each subsequent stage (C, D, E, F, G, H) always applies more pressure in comparison to each one used in the previous stage.

Preferably the membranes (6,7,8) selected for the filter arrangement of the present invention have semi-permeable walls, featuring pores which allow substances of molecular weight up to 25,000 Da to exit.

Advantageously, the whey compartment (11) at the center of the spiral wound communicates with the whey collection chute (tube) (9), for example by means of holes of the whey collection chute in question (9).

Preferably, in the arrangement of the current invention, when the desired fat content of the final product is 2%, the concentration ratio of the yoghurt feed is 3.2 and respectively smaller or bigger than that, according to the desired viscosity of the final product; additionally, when the desired fat content of the final product is 10%, the concentration ratio of the yoghurt feed is 2.3 and smaller or bigger respectively, according to the desired viscosity of the final product.

The current invention also describes a method of producing strained yoghurt on an industrial range and in big quantities, which involves the following stages:

a pump (1) is fed with incubated yoghurt, which contains an amount of fat that is a function of the desired final fat content of the strained yoghurt, another pump (2) transfers a significant portion of the yoghurt to the first straining stage (A), yoghurt (4), which has been submitted to a primary straining, and whey (3) is produced during the first straining stage, the whey (3) is collected for other use, the strained yoghurt (4), after having been submitted to the first stage, enters the second stage of straining (B) by means of a new pump (13) and the said method is characterized by the following:

the straining process is multiple, thus it is taking place at least twice, every straining stage comprises at least one filter made of flexible straining membrane (6, 7, 8) and a whey collection chute (9), the flexible straining membrane is wound in spiral around the whey collection chute (9), in such a way so that the yoghurt inserted by means of the pressure of the introduction pump (2) is pressurized and its whey enters through the straining membranes in an adjacent whey-collection compartment layer (11), which compartment leads the whey to the collection chute (9), after the first (A) straining process, the strained yoghurt is lead into a second straining stage (B) by means of a pump (13), where the same process of straining and removal of the collected whey is repeated.

Preferably, according to the method of the current invention, the multiple straining process involves eight stages (A, B, C, D, E, F, G, H), namely the straining takes place eight consecutive times, wherein the characteristics and conditions of the second stage are repeated from the third stage and to every consecutive step onwards.

Preferably, according to the method of the current invention:

each straining stage involves at least three flexible straining membranes (6,7,8), which function simultaneously and in parallel;

during the first straining stage (A) in comparison to the stages from the second one (B) onwards to each subsequent stage (C, D, E, F, G, H) the flexible straining membranes are wound in denser spiral, with the distances between the spiral wounds being narrower and the membranes being divided by thinner layers (10);

we use different types of straining membrane cartridges, namely during the first straining stage (A) the separation grid is thinner, while from the second straining process (B) onwards a thicker separation grid is used;

the pump (13) of the second straining stage (B) and of every subsequent stage (C, D, E, F, G, H) always applies more pressure in comparison to the previous pump of the previous stage.

Preferably, in the method of the present invention, when the desired content of fat of the final product is 2%, the yoghurt feed concentration ratio is 3.2 and relatively smaller or bigger than such, according to the desired viscosity of the final product; in the case that the desired content of fat of the final product is 10%, the yoghurt feed concentration ratio is 2.3 and relatively smaller or bigger than such, according to the desired viscosity of the final product.

Preferably, as far as the preference of milk as a raw material is concerned, based on the current invention:

milk is pasteurized at a temperature between 90 and 97 C, for a time period ranging from 1 to 7 min, the homogenization of the milk as a raw material has taken place at a temperature between 60 and 80 C, under pressure conditions of 50 to 350 bar and the incubation has taken place at a temperature between 37 and 45 C, when the incubation ceases, the yoghurt has a pH ranging from 4.3 to 4.7 before the yoghurt reaches the membranes, it is heated at a temperature between 50 and 60 C for a time period ranging from 1 to 3 min.

Preferably, in respect of the strained yoghurt produced by means of the arrangement and method of the current invention, after the straining the final product (5) is cooled down and stored before its packaging at a temperature between 20 and 40 C; the final product is stored at a temperature between 20 and 40 C.

DESCRIPTION OF THE FIGURES

The current invention is presented by means of the figures below, which are indicative and should not be interpreted restrictively regarding the subject of the invention.

Figure 1:
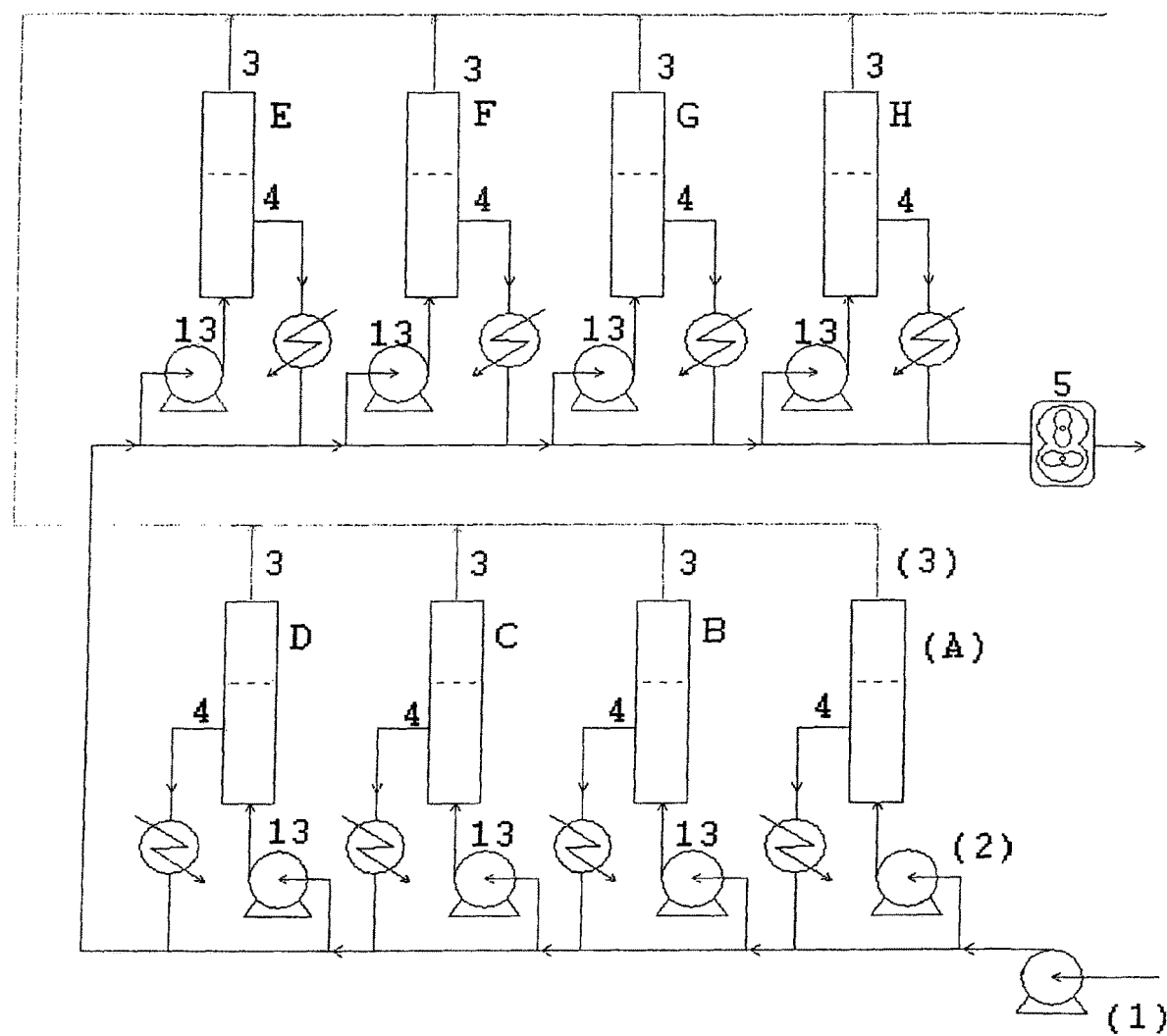
FIG. 1 depicts a flow chart of the multiple straining arrangement of yoghurt, which involves eight stages of straining.

More specifically, FIG. 1 demonstrates an application of the invention, where the yoghurt to be submitted in the straining process is introduced by help of a pump (1) and begins to be channeled in a central pipeline (14). Right after, a partial amount of this yoghurt is sucked by the pump (2) and by such it is introduced in the first straining stage (A), where it is concentrated, namely pressurized, as a result of Which it gives away whey. The collected whey exits from an exit at the point (3). The yoghurt, which has been submitted to a primary straining during the first straining stage exits the area (4) and is introduced, namely it is inserted again into the main pipeline (14). From this point onwards, the yoghurt that is in the central pipeline (14) is strained in some extent in comparison to the yoghurt which is introduced into the first pump (1). By means of a new pump (13), a partial amount of the yoghurt is sucked and is then heading towards the second stage of straining (B). During the second straining stage, the yoghurt that was already submitted to the first stage of straining is being strained again and more whey is removed (3), while the yoghurt exits (4) and is channeled again into the central pipeline (14), where now the level of straining is higher than before. In the same way, the third level of straining is carried out (C) etc. This figure depicts that this process is repeated eight (8) times in the specific example through the additional stages D, E, F, G, H. Ultimately, the strained yoghurt is collected (5).

It is essential that the straining process described in the present invention is repeated more than once and that the membranes used during the first straining stage are different from the ones used in the second one, as described in the present. Right after, the straining can be repeated for a third time or more.

Figure 2:
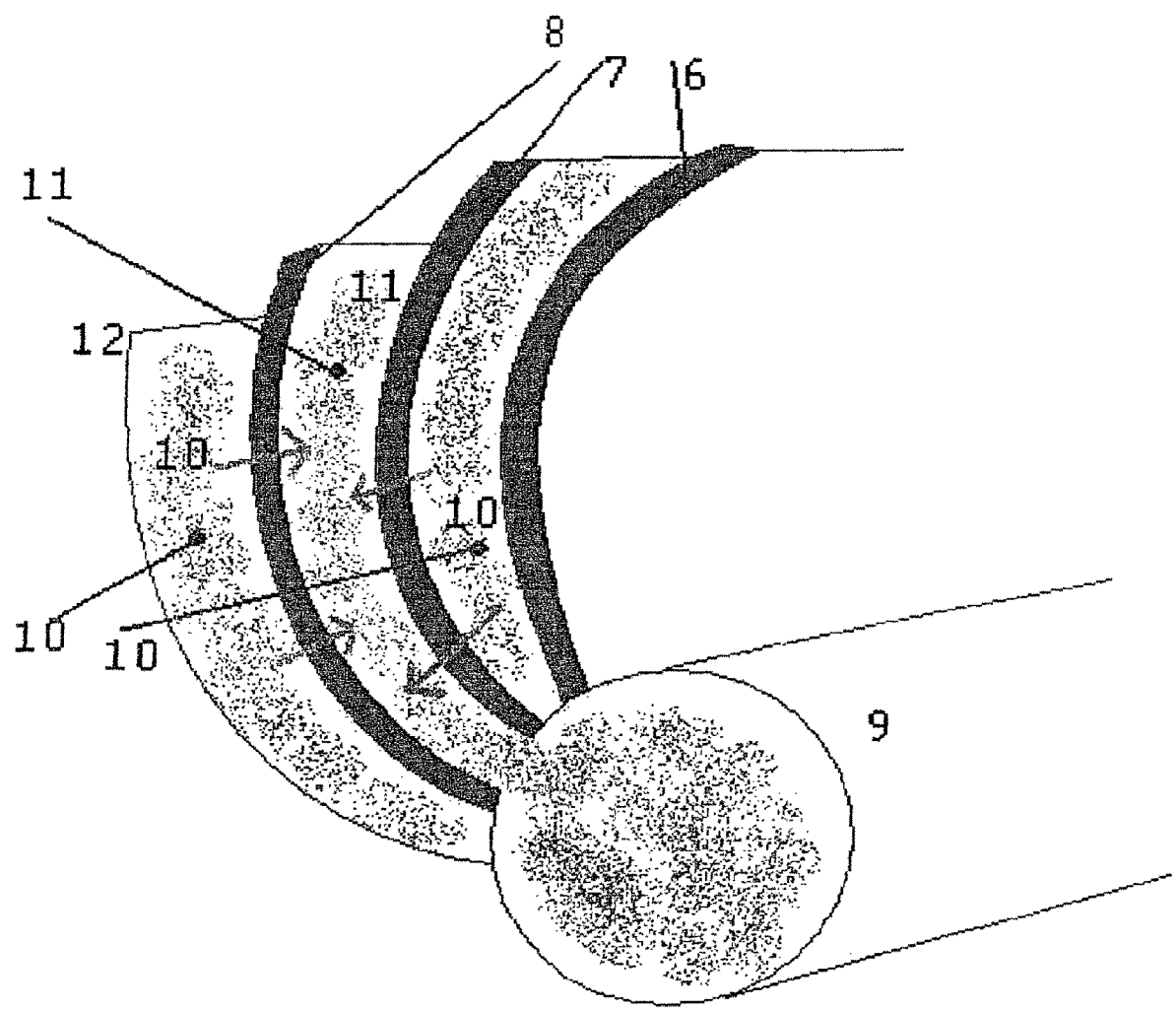
FIG. 2 depicts a cross section of a straining stage of the arrangement of the invention.

FIG. 2 depicts an indicative cross-section of a straining element (membrane cartridge), which features three flexible membranes used in yoghurt straining (6, 7, 8), which membranes are wound in spiral around the whey collection tube (9). These membranes form three compartments, the one next to the other, the middle one of which (11) is the compartment wherein whey is extracted under the pressure and the consequent "sweating" of the yoghurt, while the yoghurt is introduced and pressurized within the other two compartments (10). The whey compartment (11) communicates with the whey collection chute (9). In order to avoid the membranes' (6,7,8) sticking together, the whey compartment (11) consists of special permeable material, which receives and leads the whey to the tube (9); as for the compartments (10), these feature a grid, through which the yoghurt can flow. This sequence of membranes is repeated in circle more than once around the tube, e.g. more than one whey compartments (11) end up in the tube. Indicatively, another porous membrane is indicated as (12) such as 6,7,8 etc. . . . .

The entire technical arrangement is isolated from the environment, which ensures the automatic cleaning in place (C.I.P.) and disinfection of the membranes and the rest of the elements without them having been exposed to possible pollution or contamination before each production, with an obvious benefit in terms of product hygiene and safety.

EXAMPLES

One application of the present invention is as follows:

On the entrance of a central pipeline we feed already-made yoghurt in order for it to be strained. This yoghurt is transported by means of a pump (1) to the consecutive stages of straining (A, B and next) by means of consecutive pressure phases. A significant quantity of the yoghurt, which is still thin since it hasn't been submitted to any straining yet, is introduced by means of pressure of the pump (2) into the first (A) straining stage.

Every straining process involves a filter, which comprises at least one series of cartridges, made of flexible porous membrane, which is wound in spiral. The cartridge features the whey collection tube (9) in the middle, which has holes at the point where the whey compartment ends (11). Because of the pressure submitted to the yoghurt during its introduction via the pump (2) into the compartments (10), the yoghurt "sweats" whey through the pores of the membranes (6,7,8), this whey enters in compartment 11 and subsequently reaches through holes the central pipeline (9), where it's collected and put away.

The example of the current invention demonstrated in FIG. 2 involves three flexible porous membranes (6,7,8) which are wound in spiral the one next to the other. This arrangement is repeated in circle more than once.

An advantage of the use of such membranes relies on the fact that they're wound in spiral (SPIRAL WOUND), so they provide us with a very large surface. In order to have the same straining outcome with ceramic membranes, which cannot be wound, we would need too many of them, resulting in huge cost and bigger space requirements.

Those membranes (6,7,8), along with the permeable material of the compartment (11) and the compartment matrix (10), form three compartments, the one next to the other; especially in the internal part of the membranes wound in spiral, the straining membranes (6) and (7) form the yoghurt compartment (10), next to which the straining membranes (7) and (8) form the whey compartment (11), next to which the straining compartment (8) is formed and the next membrane displayed indicatively (12) form the yoghurt compartment (10) etc. Those membranes create filters, which function in parallel, namely simultaneously and not the one after the other.

Under pressure from the pump (2), the yoghurt is inserted into the yoghurt compartments (10), where the pressure makes the yoghurt "sweat and whey exits; the whey goes through the pores of the membranes (7) and (8) into the whey compartment (11). The whey compartment (11) in the middle of the spiral wound communicates with the whey collection chute (9), for example through holes in the whey collection chute in question (9). The whey exits the straining stage through a special channel (3) and is collected for further use.

The membrane selected for the filter has a semi-permeable wall, featuring pores that allow the transit of substances of molecular weight, which does note exceed 25.000 Da, given the fact that the whey includes water, lactose, minerals etc.

After having gone through the filter formed by the flexible membranes that are wound in spiral and thus after having been submitted to the first stage of straining (A), the yoghurt is now richer, namely thicker, which means that it is less liquid than before it was introduced into the first stage (A) because the whey has been removed from it. Then the yoghurt, in that state, exits through a special vent (4) in order to be taken in the same way by use of pump (13) to the next stage (B) and to each and every remaining stages, if any.

Due to the fact that the yoghurt introduced into the first straining stage (A) is more liquid and less dense compared to the product introduced into the second and any consecutive straining stage(s) (B to H in our example), during the first straining stage (A), the yoghurt compartments (10) are to feature a grid of a different, namely of a smaller thickness in comparison to the one used in the next straining stages (B to H). Due to the fact that the yoghurt is more thin during the first straining stage (A), it can go easily through the compartments (10), even though these are narrower in comparison to the ones used in stage B onwards.

In the specific stage, by using thinner stacks (10) we can wrap the package of the membranes in more rounds around the tube, until we reach the desired cartridge diameter, and in this way we ensure a larger membrane surface in total and thus better straining capacity.

From the second (B) straining stage onwards up to the eighth one (H), we use a thicker grid in the compartment (10), so that the compartment can become more spacious, which means that the membranes can be placed with a bigger distance in-between them in order to facilitate the flow between them of a relatively more viscous liquid. This is due to the fact that, following to the straining, the yoghurt becomes more and more dense, so it needs more space in order to easily move. Therefore, in our arrangement at least two types of straining membrane cartridges are utilized.

Furthermore, the pump (13) of the second stage of straining (B) has always more pressure in comparison to pump (2) that is used in the first stage (A), precisely due to the fact that the yoghurt introduced into the second phase (B) has already been drained once, so it contains less whey.

The straining is multiple, since at least two consecutive yoghurt straining stages are implemented, which stages are differentiated in terms of characteristics as described above.

The specific example demonstrates eight different stages of straining (A, B, C, D, E, F, G, H), where from the third stage (C) onwards (D, E, F, G, H) the filters have the same characteristics as the ones used in the second stage (B). Each one of the pumps (13) used in each one of the following stages (C, D, E, F, G, H) also apply more pressure in comparison to the preceding one(s). Depending on the desired fat content of the final product, the yoghurt, which is at first introduced (1), as well as the concentration ratio vary in order to reach the final product (5), which is produced by means of the arrangement and method of the present invention. The concentration rate demonstrates the ratio of the yoghurt fed into the invention's arrangement versus the rate of the final product (5).

To be more specific, when the desired content of fat of the final product is 2%, the yoghurt feed concentration ratio is 3.2 and respectively smaller or bigger than such, depending on the desired viscousness of the final product. Namely, for 1 unit of final product (5) the quantity of yoghurt fed (1) equals to 3.2 times the final product and/or of smaller or bigger rate, according to the desired viscousness of the final product.

When the desired content of fat of the final product is 10%, the yoghurt feed concentration ratio is 2.3 and respectively smaller or bigger than such, according to the desired viscosity of the final product; namely, for 1 unit of final product (5) the quantity of yoghurt fed (1) equals to 2.3 times the final product and/or of smaller or bigger ratio, depending on the desired viscosity of the final product.

The multiple straining described in the present invention enables to avoid the huge mechanical strain that would be needed for the filtering, in case it took place fewer times, as well as to avoid the danger of premature saturation of the membranes, resulting in a decrease in straining capacity during production.

In order to achieve the same straining outcome through fewer straining stages, the pumps should have to work with more power, which would result in more mechanical strain of the raw materials of yoghurt and of the components and parts of the invention's arrangement alike.

Disadvantages of the above would be the straining of membrane(s) by possible clogging, which ultimately leads to an increase of maintenance and repair cost and possible destruction of the membrane(s), as well as to the straining of the final product, which would have been less viscous than it is desired for strained yoghurt. Furthermore, on a production of industrial scale it is desired that the final product should be produced at a reasonable, acceptable production time and at predictable conditions in terms of quantity and production.

Prior to the straining of yoghurt, based on the above:
Milk is pasteurized at a temperature between 90 and 97 C, for a time ranging from 1 to 7 min,
the homogenization of the milk raw material has taken place at a temperature between 60 and 80 C, under pressure conditions of 50 to 350 bar and
the incubation has taken place at a temperature between 37 and 45 C,
upon cease of the incubation, the yoghurt has a pH ranging from 4.3 to 4.7
before the yoghurt reaches the membranes, it is heated at a temperature between 50 and 60 C for a duration ranging from 1 to 3 min.

The process of strained yoghurt production according to the present invention is completed by the stages following to the straining, namely after the straining the final product is cooled down and stored before its packaging at a temperature between 20 and 40 C and the final product is stored at a temperature between 20 and 40 C.

The invention claimed is:

1. A system for the production of strained yoghurt on an industrial scale, which comprises:
a first pump which is fed with incubated yoghurt with a fat content dependent on a predetermined fat type of strained yoghurt,
second and third pumps which transfer the yoghurt in order for it to be strained,
the yoghurt is introduced in a first stage of straining (A) through the second pump, the first stage of straining includes at least one first filter that is made of at least one straining membrane and a whey collection tube,
the whey is collected in the whey collection tube, after the first stage of straining,
after the first stage of straining (A), the strained yoghurt goes through a second stage of straining (B) by means of the third pump, the second stage of straining includes at least one second filter that is made of at least one straining membrane and a whey collection tube, and wherein:
the straining process taking place at least twice,
each of the at least one straining membranes are wound spirally around the respective whey collection tube, in such a way so that the yoghurt that is inserted is pressurized by means of pressure of the second and third pumps and the whey enters through the at least one straining membranes in an adjacent whey collection compartment, the respective compartment leads the whey to the respective collection tube,
after the first stage of straining, the yoghurt is led by means of the second pump, to the second stage of straining, where is repeated the same process of straining and removal of the whey collected wherein the at least one membranes have semi-permeable walls having pores which allow substances of molecular weight up to 25.000 Da to exit to the whey collection compartment and the whey collection compartment at the center of the spiral wound communicates with the whey collection tube, by holes of the whey collection tube.

2. The system according to claim 1, wherein:
the multiple straining comprises eight stages (A, B, C, D, E, F, G, H), one after the other, and
from the second stage of straining (B) onwards and during the next stages of straining (C, D, E, F, G, H) the features and conditions of the second stage of straining (B) are repeated.

3. The system according to claim 1 wherein each of the straining stages comprises at least three straining membranes which function simultaneously and in parallel.

4. The system according to claim 1 wherein during the first stage of straining (A) as compared to the second stage of straining (B) and to every subsequent stage of straining (C, D, E, F, G, H)
the at least one straining membranes are wrapped in a first spiral in the first stage of straining (A), a second spiral in the second stage of straining (B) a subsequent spiral in the every subsequent stage of straining (C, D, E, F, G, H), the first spiral has a first distance between each wrapping of the first spiral, the second spiral has a second distance between each wrapping of the second spiral, the subsequent spirals have a subsequent distance between each wrapping of the subsequent spirals, the first distance is narrower than the second distance and each of the subsequent distances and
the straining membranes are divided by first layers in the first stage of straining (A), second layers in the second stage of straining (B) and subsequent layers in the every subsequent stage of straining (C, D, E, F, G, H), the first layers are thinner than the second layers and each of the subsequent layers,
wherein a first separation grid during the first stage of straining (A) is formed of the straining members of the first stage of straining (A), a second separation grid during the second stage of straining (A) is formed of the straining members of the second stage of straining (B), a subsequent grid during the every subsequent stage of straining (C, D, E, F, G, H) is formed of the straining members of the every subsequent stage of straining (C, D, E, F, G, H) and the first separation grid is thicker than the second separation grid and each of the subsequent e subsequent separation grids.

5. The system according to claim 1 wherein the third pump that is used from the second stage of straining (B) and at each of the subsequent stages (C, D, E, F, G, H) always applies more pressure in comparison to each one used in the previous stage.

6. The system according to claim 1 wherein the predetermined fat content of the final product is 2%, the concentration ratio of the yoghurt feed is 3 to 2 and when the predetermined fat content of the final product is 10%, the concentration ratio of the yoghurt feed is 2 to 3.

7. A method of producing strained yoghurt on an industrial range comprising:
feeding a first pump with incubated yoghurt which contains an amount of fat that is a function of the desired final fat content of the strained yoghurt,
transferring with a second pump a portion of the yoghurt to a first stage of straining (A),
yoghurt which has been submitted to a primary straining, and whey are produced during the first stage of straining (A),
collecting the whey,
feeding the strained yoghurt after having been submitted to the first stage of straining to a second stage of straining (B) by means of a third pump,
wherein:
the straining process is a multiple taking place at least twice,
every straining stage comprises at least one filter made of at least one straining membrane and a whey collection tube,
the at least one straining membrane is wound in spiral around the whey collection tube in such a way so that the yoghurt inserted by means of the pressure of the second pump is pressurized and its whey enters through the at least one straining membrane in an adjacent whey collection compartment layer which compartment leads the whey to the respective collection tube,
after the first stage of straining (A), the strained yoghurt is lead into the second stage of straining stage by the third pump, where is repeated the same process of straining and removal of the whey collected.

8. The method according to claim 7, wherein the multiple straining process involves eight stages (A, B, C, D, E, F, G, H), the straining takes place eight consecutive times, and wherein the characteristics and conditions of the second stage of straining are repeated from the third stage and to every consecutive stage.

9. The method according to claim 7 wherein each of the straining stages involves at least three straining membranes, which function simultaneously and in parallel, during the first stage of straining (A) in comparison to the stages from the second stage of straining (B) onwards and to each subsequent stage of straining (C, D, E, F, G, H) the straining membranes are wrapped in a first spiral in the first stage of straining (A), a second spiral in the second stage of straining (B) a subsequent spiral in the every subsequent stage of straining (C, D, E, F, G, H), the first spiral has a first distance between each wrapping of the first spiral, the second spiral has a second distance between each wrapping of the second spiral, the subsequent spirals have a subsequent distance between each wrapping of the subsequent spirals, the first distance is narrower than the second distance and each of the subsequent distances, the straining members are divided by first layers in the first stage of straining (A), second layers in the second stage of straining (B) and subsequent layers in the every subsequent stage of straining (C, D, E, F, G, H), the first layers are thinner than the second layers and each of the subsequent layers,
during the first stage of straining (A) a first separation grid is formed of the straining members of the first stage of straining (A), a second separation grid during the second stage of straining (A) is formed of the straining members of the second stage of straining (B), a subsequent grid during the every subsequent stage of straining (C, D, E, F, G, H) is formed of the straining members of the every subsequent stage of straining (C, D, E, F, G, H) and the first separation grid is thicker than the second separation grid and each of the subsequent e subsequent separation grids,
the third pump of the second stage of straining (B) and of each of the subsequent stages (C, D, E, F, G, H) always applies more pressure in comparison to the previous pump of the previous stage.

10. The method according to claim 7 wherein when the predetermined content of fat of the final product is 2%, the yoghurt feed concentration ratio is 3 to 2 and in the case that the predetermined content of fat of the final product is 10%, the yoghurt feed concentration ratio is 2 to 3.

11. The system according to claim 1 wherein the incubated yoghurt introduced in the first stage of straining (A) comprises a raw material of treated as follows:
milk is pasteurized at a temperature between 90 and 97 C, for a time period ranging from 1 to 7 min,
the homogenization of the milk as a raw material has taken place at a temperature between 60 and 80 C, under pressure conditions of 50 to 350 bar and
the incubation has taken place at a temperature between 37 and 45 C,
when the incubation ceases, the yoghurt has a pH ranging from 4.3 to 4.7,
before the yoghurt reaches the at least one straining membrane, it is heated at a temperature between 50 and 60 C for a time period ranging from 1 to 3 min.

* * * * *